F. WEGNER.
BEAN SNIPPER.
APPLICATION FILED JAN. 10, 1914.
1,189,323.
Patented July 4, 1916.
3 SHEETS—SHEET 3.
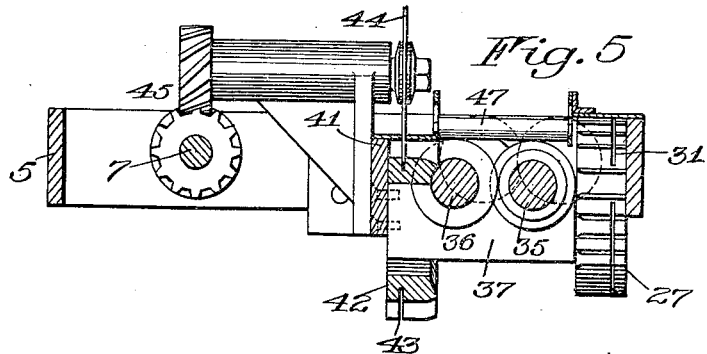
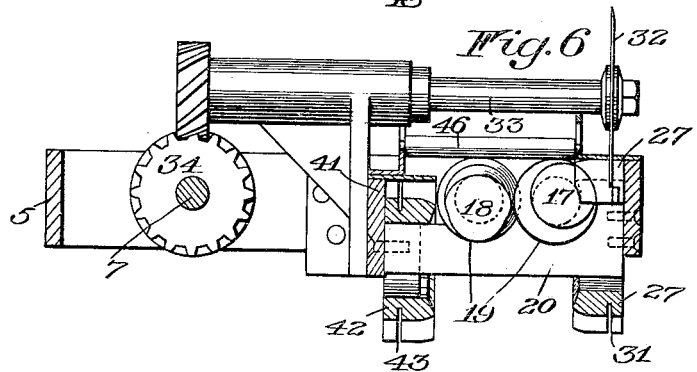
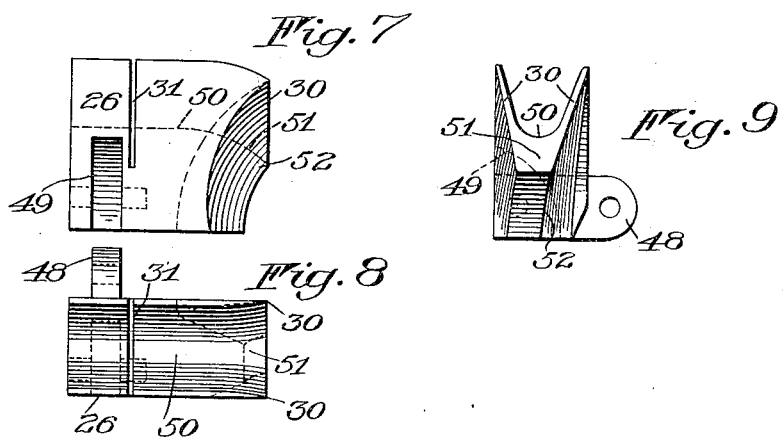
Witnesses
Walter B. Payne
Clyde L. Rogers
Inventor
Fred Wegner
By
His Attorneys

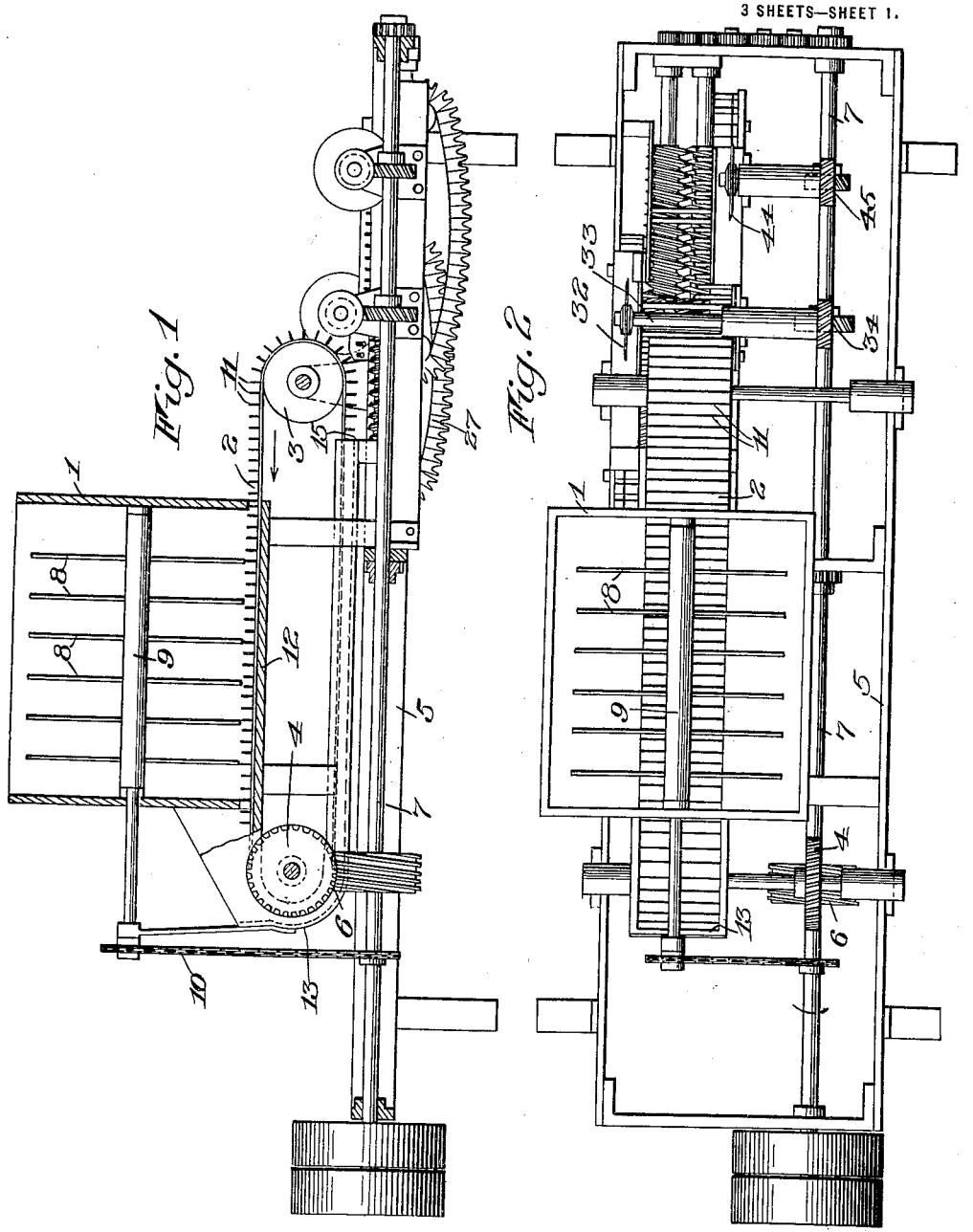

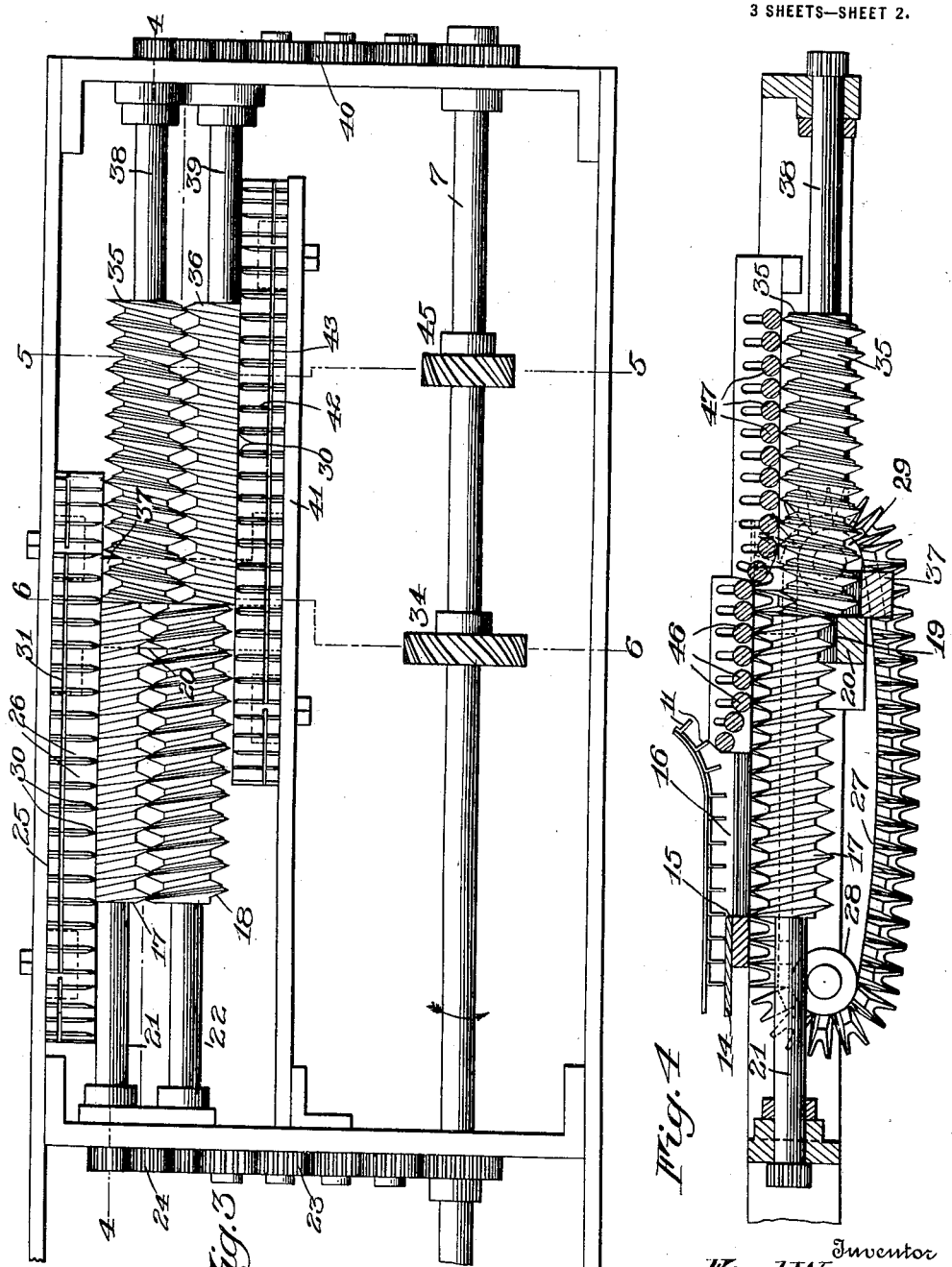

UNITED STATES PATENT OFFICE.

FRED WEGNER, OF FAIRPORT, NEW YORK, ASSIGNOR TO GEORGE W. COBB, OF MONTCLAIR, NEW JERSEY.

BEAN-SNIPPER.

1,189,323.     Specification of Letters Patent.     Patented July 4, 1916.

Application filed January 10, 1914. Serial No. 811,294.

*To all whom it may concern:*

Be it known that I, FRED WEGNER, of Fairport, in the county of Monroe and State of New York, have invented certain new and useful Improvements in Bean-Snippers; and I do hereby declare the following to be a full, clear, and exact description of the same, reference being had to the accompanying drawings, forming a part of this specification, and to the reference-numerals marked thereon.

The invention relates to apparatus for performing trimming or cutting operations such as snipping the ends of string beans or analogous lines of work.

A prime object of the invention is to provide an improved organized machine adapted to handle the beans rapidly and to trim them in the required manner with precision and certainty.

A further object is to provide improved features of construction adapted to promote efficient handling of the product so that the snipping operation is always reliably performed and the mechanism capable of long periods of service.

To these ends, in a preferred embodiment, the invention consists in conveying mechanism, shown as of rotary spiral form adapted to carry the beans forward to the cutter with a positive movement, while at the same time by the rotation of the spiral the beans are yieldingly pressed or chucked against a barrier so that they are alined for snipping at the right point by a suitably mounted cutter.

In accordance with a further feature of the invention I mount in coöperative relation with these spiral conveying devices another conveyer for movement in timed relation thereto, containing pockets adapted to receive the ends of the beans to be snipped and to hold them in immediate operative relation to the cutter, supporting them, as shown, at both sides of the cutter.

According to a still further feature of the invention two pairs of spiral conveying elements are arranged and driven so as to move the beans continuously forward in the same direction transversely *i. e.* toward the cutters, but the first pair of spirals being adapted to move the beans endwise in one direction to aline the ends of the beans at one side in position for one cutter, while the other pair of spirals are arranged to move the beans endwise in the other direction to aline their other ends for snipping by the second cutter.

Further features of the invention have to do with improved means for supplying the beans to the spiral conveying elements, and holding the beans straight and alined, while being acted on by the cutters.

The above and other objects and features of the invention will be better understood from the following detailed description taken in connection with the accompanying drawings and thereafter pointed out in the appended claims.

Referring to the drawings wherein like reference characters among the several figures indicate the same parts: Figure 1 is a longitudinal vertical section through a machine wherein my invention is embodied; Fig. 2 is a plan view of the machine; Fig. 3 is a plan view of certain of the operating parts with the parts removed for clearer showing; Fig. 4 is a longitudinal vertical section on the line 4—4 of Fig. 3; Fig. 5 is a transverse section on the line 5—5 of Fig. 3; Fig. 6 is a transverse section on the line 6—6 of Fig. 3; Fig. 7 is a detail side elevation of one of the links of a conveyer chain; Fig. 8 is a plan view of the link shown in Fig. 7, and Fig. 9 is an end view of the same link.

The beans are supplied from a hopper 1 to the endless conveyer 2 over which the hopper is positioned, said conveyer being mounted to operate over rolls 3, 4 journaled in suitable spaced relation on the machine frame-work 5, one of said rolls having a worm gear driving connection 6 to the prime drive shaft 7 of the machine which is journaled in and extends lengthwise of the frame-work 5. The hopper 1 is shown as having journaled therein an agitator consisting of a series of arms 8 projecting radially from a shaft 9 journaled in the hopper and shown as driven by a sprocket connection 10 from the shaft 7. The conveyer 2 is equipped with spaced apart transverse fins 11 to constitute receiving pockets for the beans, and the arms 8 revolve in planes parallel with said fins so that the beans are agitated by the action of said fins and alined to drop into the conveyer pockets, the receiving portion of the conveyer being shown as resting on, and supported by, a table formation 12 so that this portion of the conveyer is held in proper relation to the agitator, at the bottom of the hopper. The top stretch of the conveyer 2 moves to the left, as indicated by the arrow in Fig. 1, and at the left hand end where it passes down around the roll 4 a guard 13 is provided positioned to fit around the tops of the fins 11 so as to keep the beans from dropping out. This guard extends around to a point intermediate the lower stretch of the conveyer where it ends at 15, uncovering the pockets and permitting the beans to drop down the passage 16 onto a pair of screw or spiral conveyer elements 17, 18 disposed adjacent to each other and in parallelism, the screws constituting these elements being formed with deep grooves to receive the beans and it being understood that these screws are spaced apart the proper distance so that the ends of the beans are supported on the respective screws. The spirals 17, 18 rest in semi-circular seats 19 formed in a cross piece 20 of the frame work and they are carried on shafts 21, 22 driven by a gear train 23 from the prime drive shaft 7, the shaft 21 being shown as driven from the shaft 22 by an idler 24, so that both spirals turn in the same direction. This direction of spiral movement is such that the beans are moved endwise across the screws as well as longitudinally of the screws until they come against a backing piece or alining barrier 25, when further endwise movement is prevented and they then move transversely, or longitudinally of the screws, with their ends to be snipped chucked and kept pressed against the backing piece 25 and thus held in alinement. As the beans are delivered to this position, the ends to be snipped are at the same time positioned in pockets 26 of an endless chain conveyer 27 mounted on spaced apart rolls 28, 29. As best seen in Fig. 3 the pockets 26 are in register with the bean receiving grooves of the screw 17, 18 so that as the beans are moved endwise by said screws they are positioned in said pockets; to facilitate the entrance of the beans into said pockets the ribs of the chain links constituting the walls of said pockets are shown as beveled to an edge as at 30. The chain 27 is preferably moved in synchronism with the screw movement by positioning the same so that the adjacent edge 30 of the chain links are engaged by the peripheries of the screw convolutions which thus move the chain forward and insure the keeping of its pockets in bean receiving alinement with the screws as described. The chain 27 has its links slitted to form a continuous slot 31 extending down beneath the bottoms of the pockets 26 and affording clearness for a rotary cutter 32 shown as a thin disk extending down into said slot. This cutter is mounted on the shaft 33 journaled in the frame work and is shown as driven by spiral gears 34 from the drive shaft 7. The slot 31 and cutter 32 are spaced from the backing plate 25 a proper distance so that the correct amount will be snipped from the ends of the beans as they rest in the pockets 26 with their ends held against the plate 25. One end of the beans being thus snipped, as they get to the ends of the screws 17, 18 they drop onto another similar pair of conveyer screws 35, 36 positioned somewhat below the screws 17, 18 and with their ends abutting against the ends of the screws 17, 18, as shown in Figs. 3 and 4. The screws 35, 36 similarly have their outer ends resting in semi-circular seats of support pieces 37 and they are driven by shafts 38, 39 and gearing 40 from the drive shaft 7, the gear train 40 being arranged to drive the screws 35, 36 in a direction opposite to that of the screws 17, 18 so that as the beans rest on these screws they are moved away from the backing plate 25 toward and against another similar backing plate 41 at the other side of the screws. A conveyer chain 42, similar to the chain 27, is mounted at this side of the mechanism equipped with similar pockets and with a slot 43, similar to the slot 31, in which operates a rotary cutter 44, similar to the cutter 32, and driven by spiral gearing 45 from the shaft 7.

I prefer to provide means to insure the holding of the beans in operative relation to the screws 17, 18 as they rest thereon and to assist in straightening and alining the beans and to this end I show a series of rollers 46 having bearings in vertical slots 47 so as to be slidable by gravity to rest on the tops of the screw convolutions and thus keep the beans in the grooves of said screws.

In Figs. 7, 8 and 9 I show a preferred form of the links for the conveyer chains 27 and 42. This link has a usual tongue 48 at one side fitting into a slot 49 at the adjacent side of the next link and the pocket bottom 50 is rounded off at the receiving end, as at 51, to facilitate the entrance of the beans. The front beveled edge of these links is also shown as specially rounded and spirally inclined as at 52 to correctly engage with the spiral contour of the screw convolutions to be operated thereby.

In use, the beans being placed in the hopper 1, are agitated by the revolving arms 8 and as they come into alinement with the pockets on the conveyer 2 they drop there into and are carried thereby around until they come to the discharge passage 16 where they drop down onto the conveying spirals 17, 18. By these spirals they are moved transversely with a substantially positive action by the engagement of the spiral ribs thereof, and at the same time they are given a frictional impulse endwise i. e. across the spirals which causes them to enter the pockets 26 of the conveyer 27 as it is moved in time with the spirals by engagement with the ribs thereof, the ends of the beans thus coming against barrier plate 25 to be alined thereby. The ends to be snipped thus project across the slots 31 and as the ends of the beans are thus held in the pockets 26 supported on both sides of said slot they come against the disk cutter 32 also guided and held alined in the slot 31 so that the cutting operation is always performed with precision and certainty. Thereupon the beans as they are farther advanced come to the ends of the spirals 17, 18 and drop onto the spirals 35, 36 which, revolving in the opposite direction move the beans endwise in the other direction until they come into the pockets of the conveyer 42 at the other side of the mechanism to have their other ends snipped off by the cutter 44 as they are continuously advanced transversely. The gravity rolls 46 assist in holding the beans pressed into the grooves of the spirals, thus straightening them and keeping them pressed down as they are operated on by the cutters.

I consider the described spiral conveyer mechanism whereby the same operative parts move the beans forward to the cutter and also move them endwise for alinement to be an important feature of invention and I also consider the auxiliary conveyers shown as the chain conveyers 27 and 42 arranged as described in coöperative relation to the spirals to be of value and importance.

I am aware that these features can be embodied in other specific forms than those shown, and I, therefore, desire the present embodiment to be considered as illustrative and not restrictive and refer to the appended claims rather than to the foregoing description to indicate the scope of the invention.

I claim as my invention:

1. An apparatus of the character described comprising two parallel horizontally disposed revoluble screws having screw threads extending in the same direction arranged to receive beans and to move them transversely and endwise, a conveyer adapted to receive portions of the beans while the latter are being moved, the conveyer being actuated by one of said screws, and a cutter for snipping the beans.

2. An apparatus of the character described comprising a pair of revoluble screws disposed horizontally in juxtaposition, a conveyer arranged to be actuated by one of the screws having open ended pockets moving synchronously with said screws and adapted to receive the ends of beans carried by the screws and a cutter for snipping the ends of the beans coöperating with said pockets.

3. An apparatus of the character described comprising two pairs of revoluble screws disposed in parallel planes, one pair being arranged to receive beans from the other, said pairs of screws being arranged with their screw threads extending in different directions and each serving to move beans transversely in the same direction and alternately in different longitudinal directions and separate cutters for snipping the two ends of the beans.

4. In a bean snipper, the combination with two pairs of screw conveyers arranged to receive beans successively and rotating in directions to move them bodily transversely and longitudinally alternately in opposite directions, of separate pocket conveyers coöperating with said pairs of screws and arranged to receive the ends of the beans and cutting devices arranged to operate on the beans in said pockets.

5. In a bean snipper, the combination with a pair of screw conveyers arranged side by side and rotating in a direction to advance beans bodily transversely and longitudinally, of means coöperating with the ends of the beans to sever them and a plurality of pressing rollers arranged transversely of the conveyer screws and acting to hold the beans within the convolutions of the screw threads.

6. In a bean snipper, the combination with a pair of screw conveyers arranged side by side and rotating in a direction to advance beans bodily transversely and longitudinally, of means coöperating with the ends of the beans to sever them and a plurality of pressing rollers extending transversely of the screws and yieldingly supported.

FRED WEGNER.

Witnesses:
ANNA P. WEGNER,
WALTER F. WEGNER.